US009555679B2

(12) United States Patent
Pezza

(10) Patent No.: US 9,555,679 B2
(45) Date of Patent: Jan. 31, 2017

(54) CONVERTIBLE ELECTRIC BIKE AND BOARD APPARATUS

(71) Applicant: Leonard Pezza, Newport Beach, CA (US)

(72) Inventor: Leonard Pezza, Newport Beach, CA (US)

(*) Notice: Subject to any disclaimer, the term of this patent is extended or adjusted under 35 U.S.C. 154(b) by 0 days.

(21) Appl. No.: 14/931,656

(22) Filed: Nov. 3, 2015

(65) Prior Publication Data

US 2016/0368338 A1    Dec. 22, 2016

Related U.S. Application Data

(60) Provisional application No. 62/180,800, filed on Jun. 17, 2015, provisional application No. 62/185,805, filed on Jun. 29, 2015.

(51) Int. Cl.
| | |
|---|---|
| *B60F 3/00* | (2006.01) |
| *B62K 11/02* | (2006.01) |
| *B62K 11/14* | (2006.01) |
| *B60B 1/00* | (2006.01) |
| *B63H 5/125* | (2006.01) |
| *B63H 25/02* | (2006.01) |
| *B63B 35/79* | (2006.01) |

(52) U.S. Cl.
CPC ............ *B60F 3/0069* (2013.01); *B60B 1/003* (2013.01); *B60F 3/0007* (2013.01); *B60F 3/0084* (2013.01); *B62K 11/02* (2013.01); *B62K 11/14* (2013.01); *B63B 35/795* (2013.01); *B63B 35/7916* (2013.01); *B63B 35/7943* (2013.01); *B63H 5/125* (2013.01); *B63H 25/02* (2013.01); *B63H 2005/1258* (2013.01); *B63H 2025/024* (2013.01)

(58) Field of Classification Search
CPC ...... B60F 3/007; B60F 3/0069; B63B 35/795; B63B 35/7916; B63H 2005/1258; B63H 2005/024
See application file for complete search history.

(56) References Cited

U.S. PATENT DOCUMENTS

| | | | |
|---|---|---|---|
| 3,397,669 A | 8/1968 | Katehis | |
| 4,334,490 A | 6/1982 | Gabriel | |
| 4,613,146 A * | 9/1986 | Sharp | B62K 3/02 280/288.2 |
| 5,348,327 A * | 9/1994 | Gieske | B63B 35/7946 114/344 |

(Continued)

OTHER PUBLICATIONS

"Meet The World's First Self-Inflating Stand Up Paddleboard," retrieved online Oct. 16, 2015, http://www.supracer.com/sipa-inflatable-stand-up-paddle-board-self-inflating/.

(Continued)

*Primary Examiner* — Stephen Avila
(74) *Attorney, Agent, or Firm* — CIONCA Law Group P.C.; Marin Cionca

(57) ABSTRACT

A modular bicycle and board apparatus having a buoyant board, a front wheel, a rear wheel and handlebars mountable and usable in a first configuration as a bicycle in which the buoyant board is the bicycle's frame and in a second configuration as a surfboard by changing the orientation of the front wheel and handlebars with 90 degrees with respect to the buoyant board, the surfboard being steerable from the handlebars.

20 Claims, 14 Drawing Sheets

(56) References Cited

U.S. PATENT DOCUMENTS

| | | | | |
|---|---|---|---|---|
| 5,362,264 | A * | 11/1994 | Parant | B63B 35/795 |
| | | | | 440/29 |
| 5,605,321 | A * | 2/1997 | Jarvis | B25B 11/00 |
| | | | | 211/17 |
| 6,250,656 | B1 | 6/2001 | Ibarra | |
| 6,513,691 | B1 * | 2/2003 | Edgerly | B60R 9/10 |
| | | | | 224/324 |
| 9,061,557 | B1 | 6/2015 | Garrett | |
| 2010/0255736 | A1 * | 10/2010 | Krah | B63H 16/12 |
| | | | | 440/25 |
| 2013/0121449 | A1 | 5/2013 | Popa-Simil et al. | |
| 2013/0130578 | A1 * | 5/2013 | Friedman | B63B 35/7946 |
| | | | | 441/74 |
| 2016/0195246 | A1 * | 7/2016 | Carattini | F21S 48/30 |
| | | | | 362/486 |
| 2016/0200385 | A1 * | 7/2016 | Silva | B62J 9/001 |
| | | | | 280/202 |

OTHER PUBLICATIONS

"Balance bicycle," retrieved online Sep. 22, 2015, https://en.wikipedia.org/wiki/Balance_bicycle.

"Current drives," retrieved online Jul. 27, 2015, http://www.currentdrives.com/.

"Electric Jet Powered Kayak & Paddleborad," retrieved online Jul. 27, 2015, http://hight3ch.com/electric-jet-powered-kayak-paddleboard/.

* cited by examiner

CONVERTIBLE ELECTRIC BIKE AND BOARD APPARATUS

CROSS-REFERENCE TO RELATED APPLICATIONS

This application claims the benefit of U.S. Provisional Application No. 62/180,800, filed Jun. 17, 2015, and U.S. Provisional Application No. 62/185,805, filed Jun. 29, 2015, which are hereby incorporated by reference, to the extent that they are not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates generally to electric vehicles and more specifically to electric bicycles and boards for use in water.

2. Description of the Related Art

Paddle boards, boogie boards, and the like are popular for recreational activities in the water. Some people may also like to use bicycles to get to the water. However, it may be difficult to transport a paddle board, boogie board, or other equipment when traveling on a bicycle. When reaching a body of water, the bicycle may need to be locked up while using the paddle board or boogie board in the water. If it is desired to take the bicycle onto the water, some floatation systems may be available, but it is not possible to use the bicycle as an apparatus for paddle boarding or other similar recreational water activities. Thus, there is a need for a more convenient way to travel to the water and transport equipment for recreation in the water. There is also a need for a way to use the same equipment on land and water, decreasing the amount of equipment that must be carried, stored, or transported.

The problems and the associated solutions presented in this section could be or could have been pursued, but they are not necessarily approaches that have been previously conceived or pursued. Therefore, unless otherwise indicated, it should not be assumed that any of the approaches presented in this section qualify as prior art merely by virtue of their presence in this section of the application.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment an electric bike board apparatus is provided that is used in four different modes: a bicycle (Mode 1), a boogie board for use while lying down (Mode 2), a boogie board for use while seated (Mode 3), and a paddle board for use while standing up (Mode 4). Thus, an advantage is that a single apparatus may be used for both traveling on land and using in the water. Another advantage is that equipment would not need to be locked or stored during recreation. Another advantage is that quick conversion from one mode to another is convenient and easy for the user.

In another exemplary embodiment, a bike board apparatus is provided that can be pedaled in Mode 1. Thus, an advantage is that electric power may not be needed.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which:

FIG. 2f illustrates a side perspective view of an exemplary application of the electric bike board apparatus of FIG. 2a.

FIG. 3c illustrates a side perspective view of an exemplary application of the electric bike board apparatus 300 of FIG. 3a.

DETAILED DESCRIPTION OF THE PREFERRED EMBODIMENTS

Figure 1:
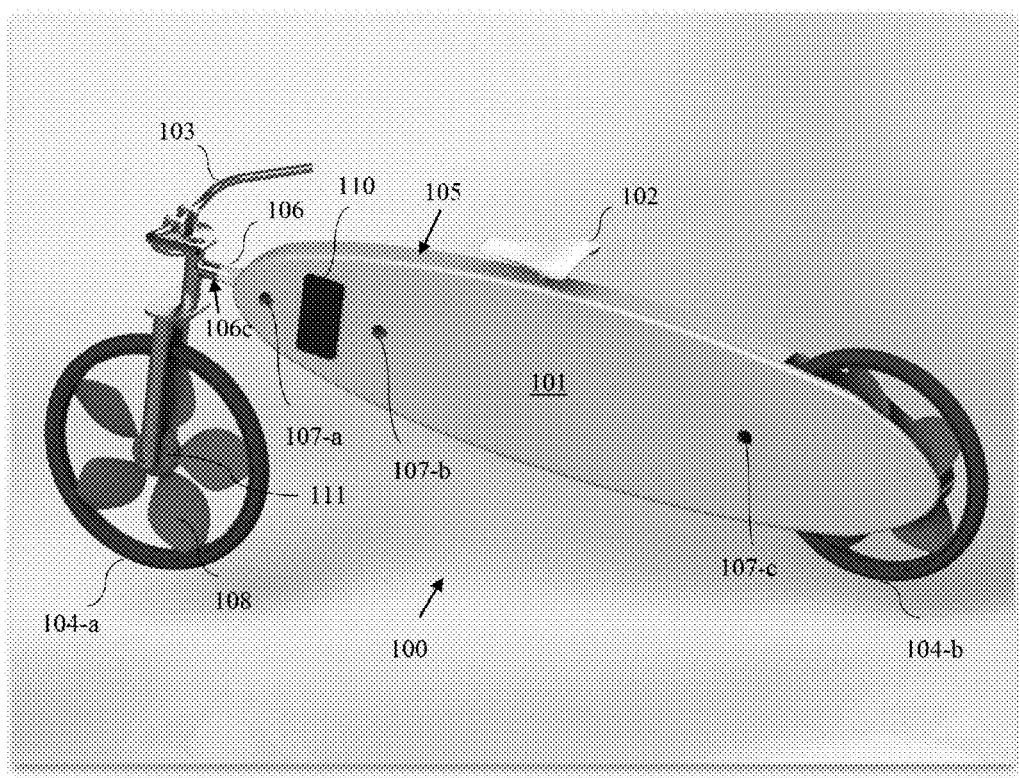
FIG. 1 illustrates a side perspective view of a convertible electric bike board apparatus in Mode 1, a bicycle, according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled structures across the figures (e.g., 102 and 202, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 illustrates a side perspective view of a convertible electric bike board apparatus 100 (hereinafter, "electric bike and board apparatus," "electric bike board apparatus," "electric bike board apparatus," "electric bike," "electric board," or "bike board") in a first mode, Mode 1, a bicycle, according to an embodiment. As shown, the body 101 of the electric bike 100 may have the shape, size and floating characteristics of a paddle board, stand-up board, boogie board, surfboard or other similar board (hereinafter, "surfboard") used for recreational purposes in water (ocean, lakes, etc.), while having the strength of a bicycle body, and may be constructed from any suitable material(s), such as, for example, plastic, foam, aluminum or combination thereof. A seat 102 may be included along a side 105 of the electric bike body 101 for a user to sit on while riding the bike. The electric bike 100 may include a front wheel 104-a and a rear wheel 104-b. The rear wheel 104-b may be recessed into the body 101, as shown. An advantage may be that the recess allows for the bike board 100 to have a long enough body 101 for a user to lay down on, while the entire length of the bike board 100 remains as short as possible. Another advantage may be that the rear wheel 104-b may be prevented from interfering with the balancing of the bike board 100 when floating in the water.

Figure 2A:
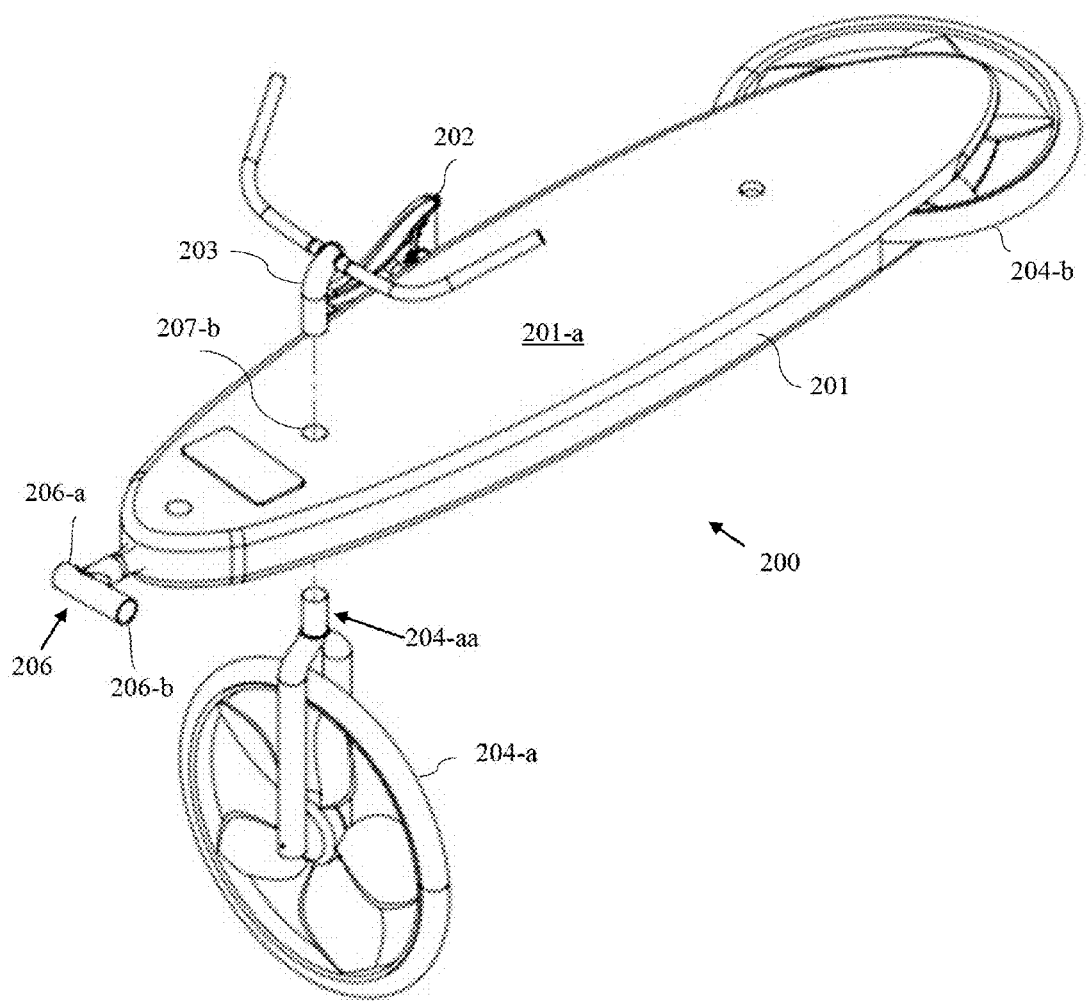
FIG. 2a illustrates a top perspective view of an electric bike board apparatus in Mode 2, a boogie board for use while lying down, according to an embodiment.

The bike board 100 may include handlebars 103 for steering the apparatus in any of the modes. The handlebars 103 and the front wheel 104-a may attach to the body 101 for Mode 1, for example, by fitting into a connector tube 106 for Mode 1. The connector tube 106 may have a first end and a second end, as shown in FIG. 2a. The body 101 may include three through slots, a first slot 107-a, a second slot 107-b, and a third slot 107-c, which may be used for changing the bike board 100 from one mode to another as it will be described hereinafter. The slots 107-a, 107-b, and 107-c may have openings on the top side (201-a, as shown in FIG. 2a) and bottom side (201-b, as shown in FIG. 2d) of the body 101. The top side 201-a and the bottom side 201-b may be the left and right sides of the bike board 100 when used in Mode 1.

Figure 9A:
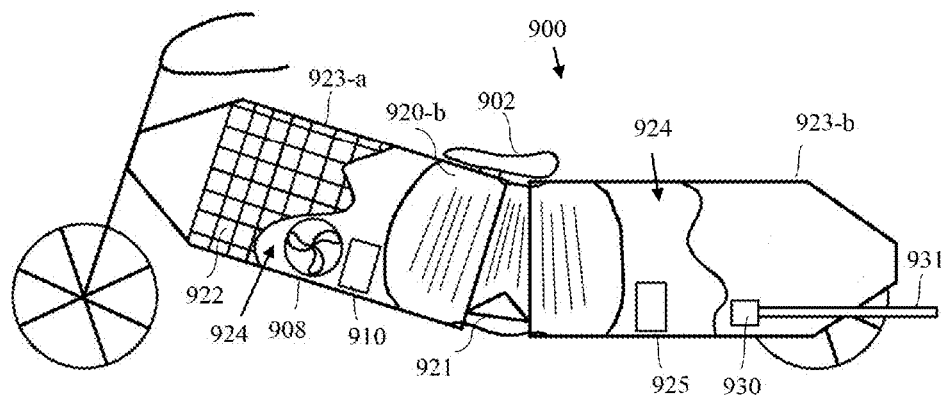
FIG. 9a illustrates a side view of a convertible electric bike board apparatus in Mode 1, a bicycle, with a cutaway showing that the bike board has an inflatable middle portion not inflated and capped by two end caps, according to an embodiment.

The bike board 100 may include an electric motor (shown in 111 as an example), and may power the front wheel 104-a, the back wheel 104-b, or both. The motor may, for example, be a hub motor 111, such that it forms a part of the front wheel 104-a, or part of the rear wheel 104-b (not shown), or both. The motor 111 may be powered with one or more batteries 110, or any other suitable power source. The batteries 110 may preferably be contained in a waterproof case in the electric bike board 100, and may be charged using solar panels (as shown in FIG. 9a) or any other suitable source.

As shown, front wheel 104-a and/or rear wheel 104-b may be adapted to include propeller 108, thus enabling the wheel(s) to have a dual function, as a bike wheel and as a water propeller. The front wheel 104-a and/or rear wheel 104-b adapted to include a propeller 108 may be configured such that the fins of the propeller 108 are also the spokes of the front wheel 104-a and/or rear wheel 104-b. An advantage may be that the fin-shaped spokes may support the wheel(s) while the bike board 100 is in use on land, and the shape of the fins may be optimized for powering the bike board 100 through water.

It should be apparent that alternatively, the bike board 100 may be run as a run/balance bike, for example, for exercising purposes.

As it will be apparent from the present disclosure, the bike board 100 is a modular apparatus configured to enable the user to easily assemble and disassemble and thus convert the bike board to the desired mode of operation. It should also be noted that several components and modules are configured to have more than one function and/or more than their traditional function(s) (e.g., bicycle body is also boogie board, front wheel is also propeller, etc.), in order to make the bike board disclosed herein amphibious and easily convertible to various modes of operation on land and/or water.

FIG. 2a illustrates a top perspective view of an electric bike board apparatus 200 in a second mode, Mode 2, a boogie board for use while lying down, according to an embodiment. An electric bike 100 in Mode 1, as shown in FIG. 1, may, for example, be converted to Mode 2 as shown in FIG. 2a by laying the body 201 flat on the water, and removing the handlebars 203 and front wheel 204-a from the connector tube 206. The handlebars 203 may be removed from the first end 206-a and the front wheel rod 204-aa may be removed from the second end 206-b. The body 201 may have a top side 201-a and a bottom side 201-b (as shown in FIG. 2d) which may face the water. The handlebars 203 may be inserted into the slot 207-b from the first side 201-a, to join the front wheel rod 204-aa, which may be inserted into the same slot 207-b from the second side 201-b. The wheels 204-a and 204-b may be made from any suitable material, and may be constructed from material that may help to increase the buoyancy of the bike board 200, such as, for example, carbonite or styrofoam.

The electric bike board 200 may be converted from any mode described herein to any other mode described herein. To use the electric bike board 200 in Mode 2, 3, or 4 described earlier, the seat 202, connector tube 206, and rear wheel 204-b may remain on the body 201 as in Mode 1 (see FIG. 1). Thus, an advantage is that removal of parts is not necessary and thus parts may not need to be stored or locked up while the electric bike board 200 is in use in water.

Figure 2B:
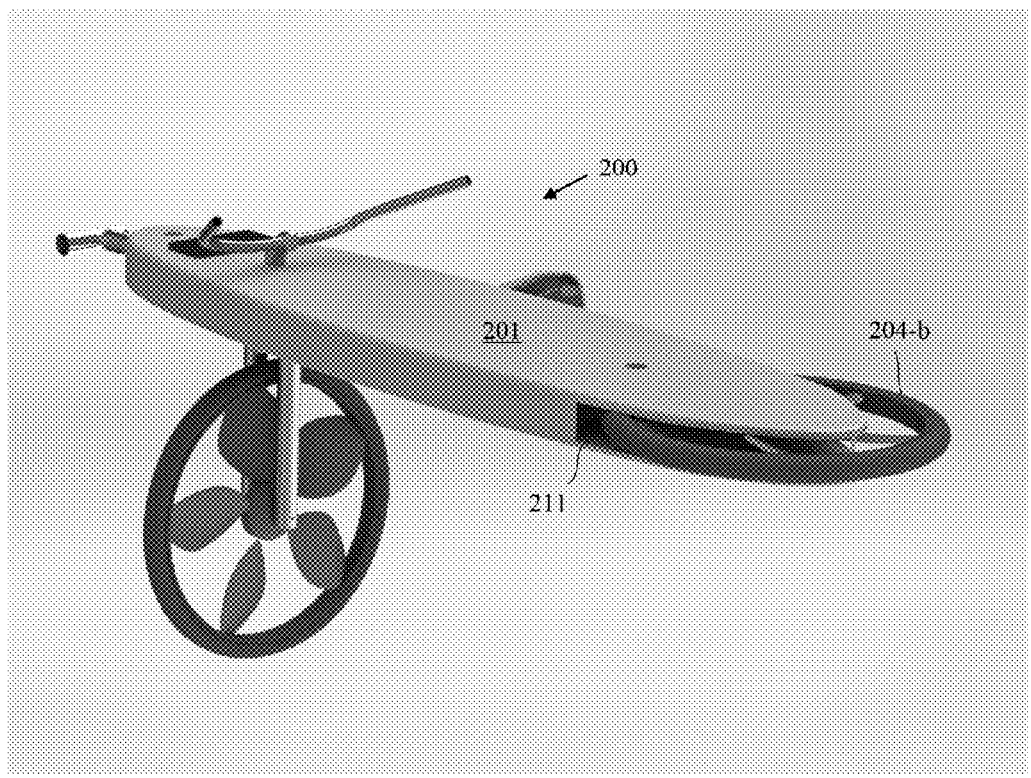
FIGS. 2b-d illustrate a back perspective, front, and bottom view, respectively, of the electric bike board apparatus of FIG. 2a in Mode 2.
Figure 2C:
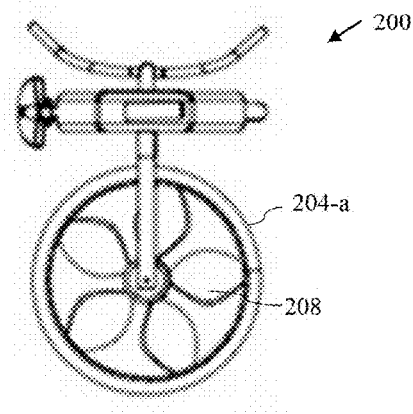
Figure 2D:
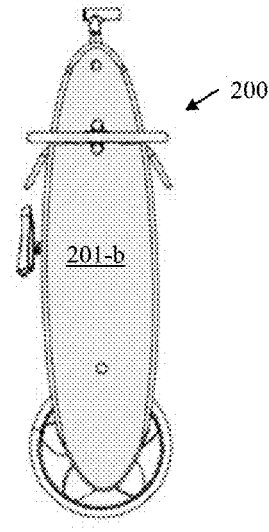

FIGS. 2b-d illustrate a back perspective, front, and bottom views, respectively, of the electric bike board apparatus 200 of FIG. 2a in Mode 2. The bike board 200 may include a propeller 208 for use in the water. The propeller 208 (108 in FIG. 1) may be part of the front wheel 204-a and may also power the bike board 200 while in Mode 1. The handlebars 203 may be connected to the front wheel 204-a and propeller 208 such that the handlebars 203 may be used to steer the bike board 200 on land and also in the water.

Figure 2E:
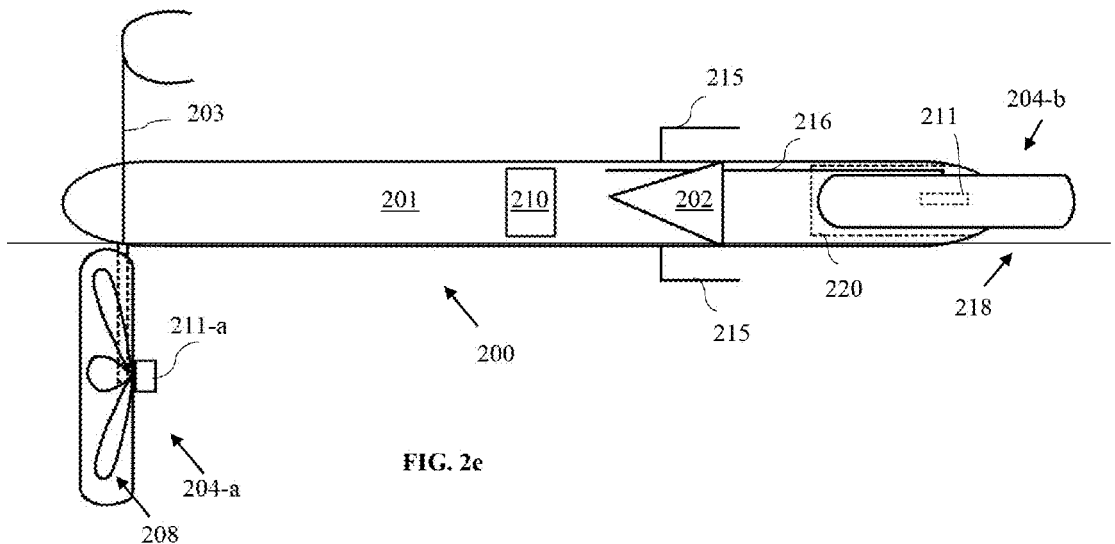
FIG. 2e illustrates a left side view of an electric bike board apparatus in Mode 2, according to an embodiment.

FIG. 2e illustrates a left side view of an electric bike board apparatus 200 in Mode 2, according to an embodiment. For switching between modes, as an alternative to the discussion when referring to FIG. 2a, the handlebars 103/203 and front wheel 104-a/204-a assembly may simply be rotatable or pivotable into the desired positions, such as, for example, at a 90 degree angle with respect to the board 101/201, to convert the apparatus 100/200 from bike to board mode and vice versa. To facilitate this, a pivotal and lockable articulation may be provided for example at 106c (FIG. 1). Thus, looking at FIG. 1 (bike mode), a user would simply rotate the handlebars 103 and front wheel 104-a assembly with 90 degrees with respect to board 101 in order to quickly convert the apparatus to board mode, wherein the front wheel 204-a may be in the body of water 218 while the board 201 floats on top of the body of water 218. The reverse process would be equally quick as well. An advantage may be that switching between bike and board modes may be achieved faster than by removing and replacing the handlebars 203 and front wheel 204-a into slots (as shown by 107-a-c in FIG. 1) of the body 201. The pivotal articulation may be accomplished by any suitable means known in the art, such as by using a portion of a pipe attached to the connector tube 206 and inserting it into another pipe portion attached to the board 201. The unlocking before rotation and the locking after rotation may be accomplished by for example using a spring loaded snapping pin and corresponding holes, which a user can disengage to unlock.

A side of the body 201 may include the seat 202, and foot pegs 215 may be included on the opposite side, such as, for example, the seat 202 on the left side and the foot pegs 215 on the right side, as shown. In an alternative embodiment, the seat 202 may be on the right side of the body 201 (as shown in FIG. 20.

The rear wheel 204-b may be recessed in a cavity 220 of the body 201. Foot pegs 215 may be connected to a wheel 204-b by a chain 216 and may be used to pedal the bike board 200 in a manual mode without electric power, such as, for example, for exercising purposes. For use with electric power, the bike board 200 may include a hub motor 211-a, which may be associated with the front wheel 204-a and/or propeller 208. The rear wheel 204-b may also be associated with an additional or substitute motor 211. The motor 211-a or motor 211 may be powered by a battery 210. Thus, for example, a user may use the bike in a manual/pedaling mode to go to the beach and use the battery power only into the water.

Figure 2F:
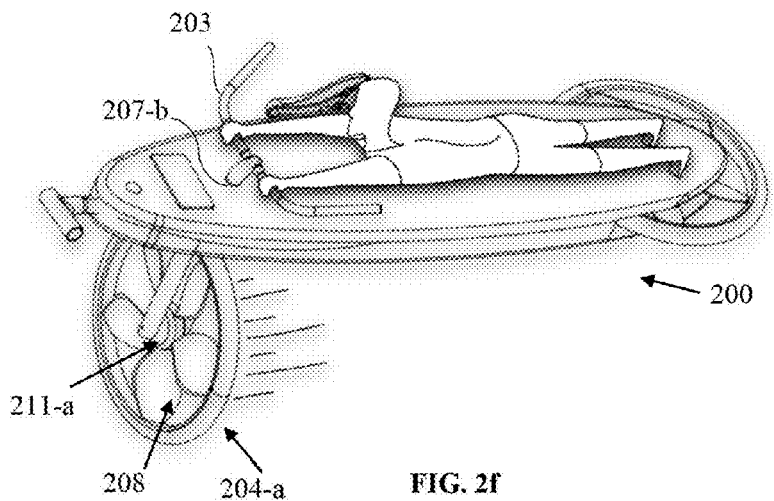

FIG. 2f illustrates a side perspective view of an exemplary application of the electric bike board apparatus 200 of FIG. 2a. A user may use the bike board 200 as a boogie board while lying down, in Mode 2. The handlebars 203 may be telescopic such that, when, for example, fitted into slot 207-b, they may adjust to the user's reach while lying down. Again, while the front bike wheel 204-a having propeller 208 is spinning powered by motor 211-a, the bike board 200 is moving forward (left in FIG. 2f). At the same time, the user may use the handlebars 203 to steer the front wheel 204-a and thus the bike board 200 in order to travel in the desired direction while floating in the water.

Figure 3A:
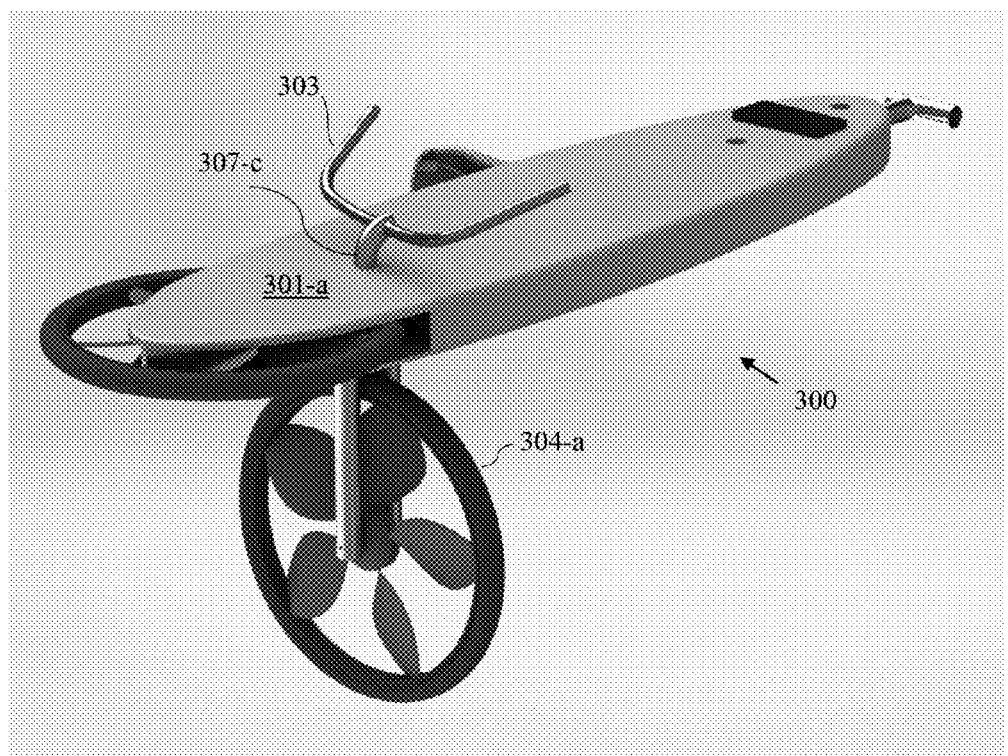
FIG. 3a illustrates a front perspective view of an electric bike board apparatus in Mode 3, a boogie board for use while seated, according to an embodiment.

FIG. 3a illustrates a front perspective view of an electric bike board apparatus 300 in a third mode, Mode 3, a boogie board for use while the user is seated, according to an embodiment. To convert the bike board 300 to Mode 3, the handlebars 303 may be inserted into the top side 301-a of slot 307-c to join front wheel's rod (see 204aa in FIG. 2a), which may be inserted into the bottom side (not shown) of slot 307-c.

Figure 3B:
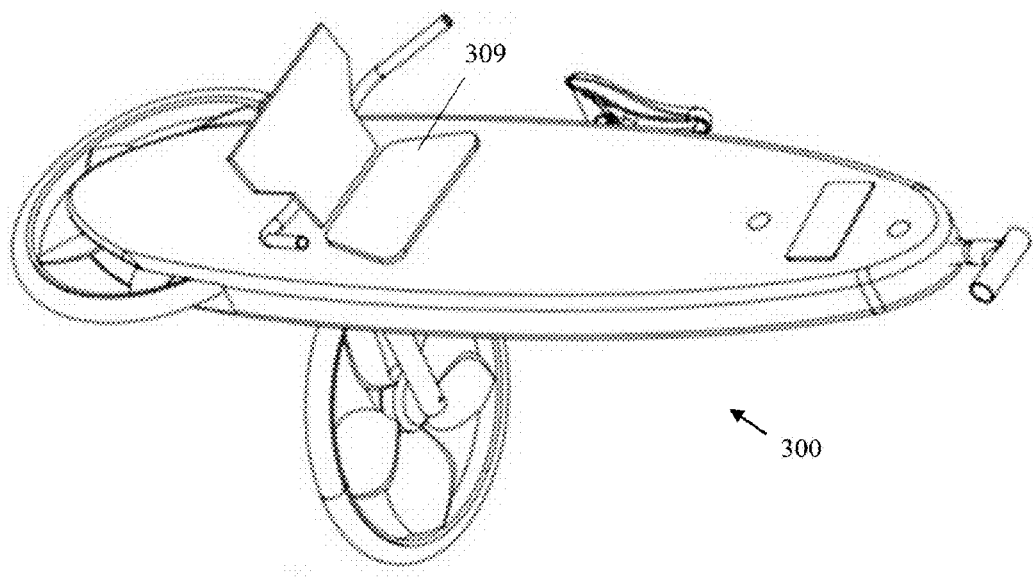
FIG. 3b illustrates a side perspective view of the electric bike board apparatus of FIG. 3a in Mode 3, with a boogie board seat.

FIG. 3b illustrates a side perspective view of the electric bike board apparatus 300 of FIG. 3a in Mode 3, with a boogie board seat. A cushion 309 may be used on the bike board 300 while in Mode 3, for added comfort to the user while seated.

Figure 3C:
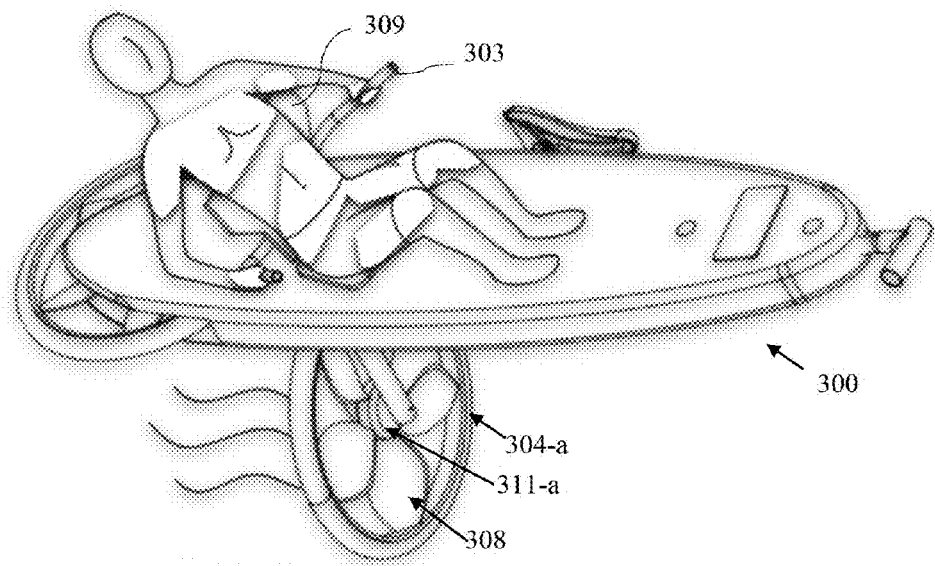

FIG. 3c illustrates a side perspective view of an exemplary application of the electric bike board apparatus 300 of FIG. 3a. Again, the handlebars 303 may be telescopic to adjust to a desired height by the user. The user may be seated on a cushion 309 and may rest against the handlebars 303. Again, while the front bike wheel 304-a having propeller 308 is spinning powered by motor 311-a, the bike board 300 is moving forward (right in FIG. 3c). At the same time, the user may use the handlebars 303 to steer the front wheel 304-a and thus the bike board 300 in order to travel in the desired direction while floating in the water.

Figure 4A:
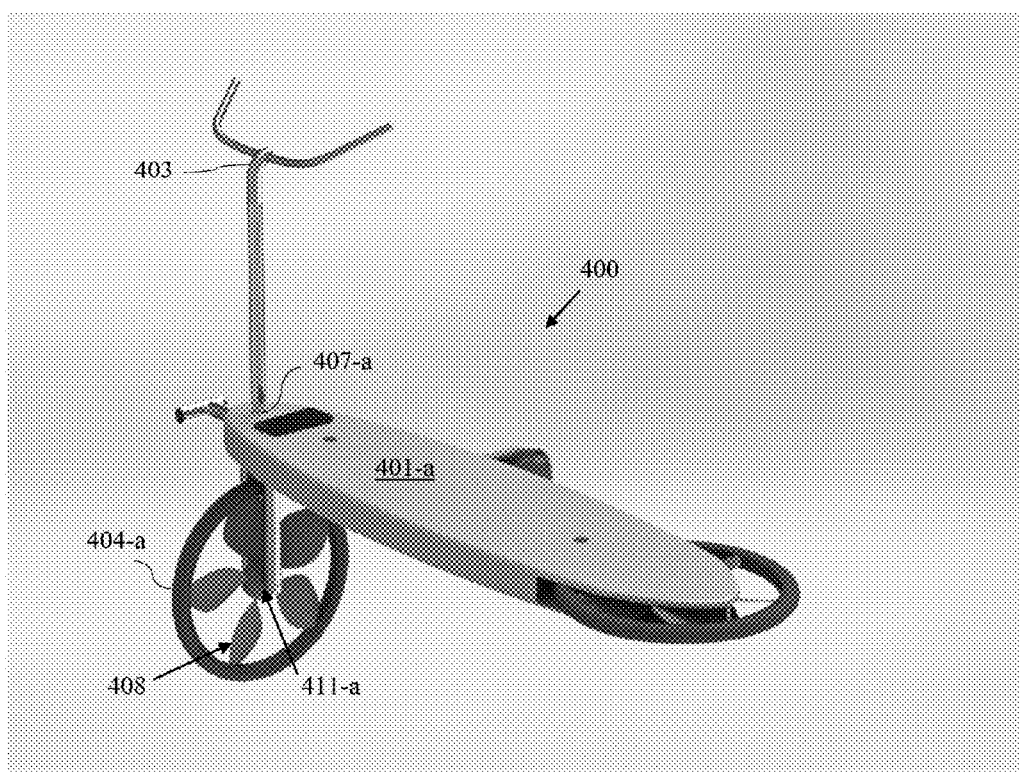
FIGS. 4a-d illustrate back perspective, front perspective, top and side views, respectively, of an electric bike board apparatus in Mode 4, a paddle board for use while standing, according to an embodiment.
Figure 4B:
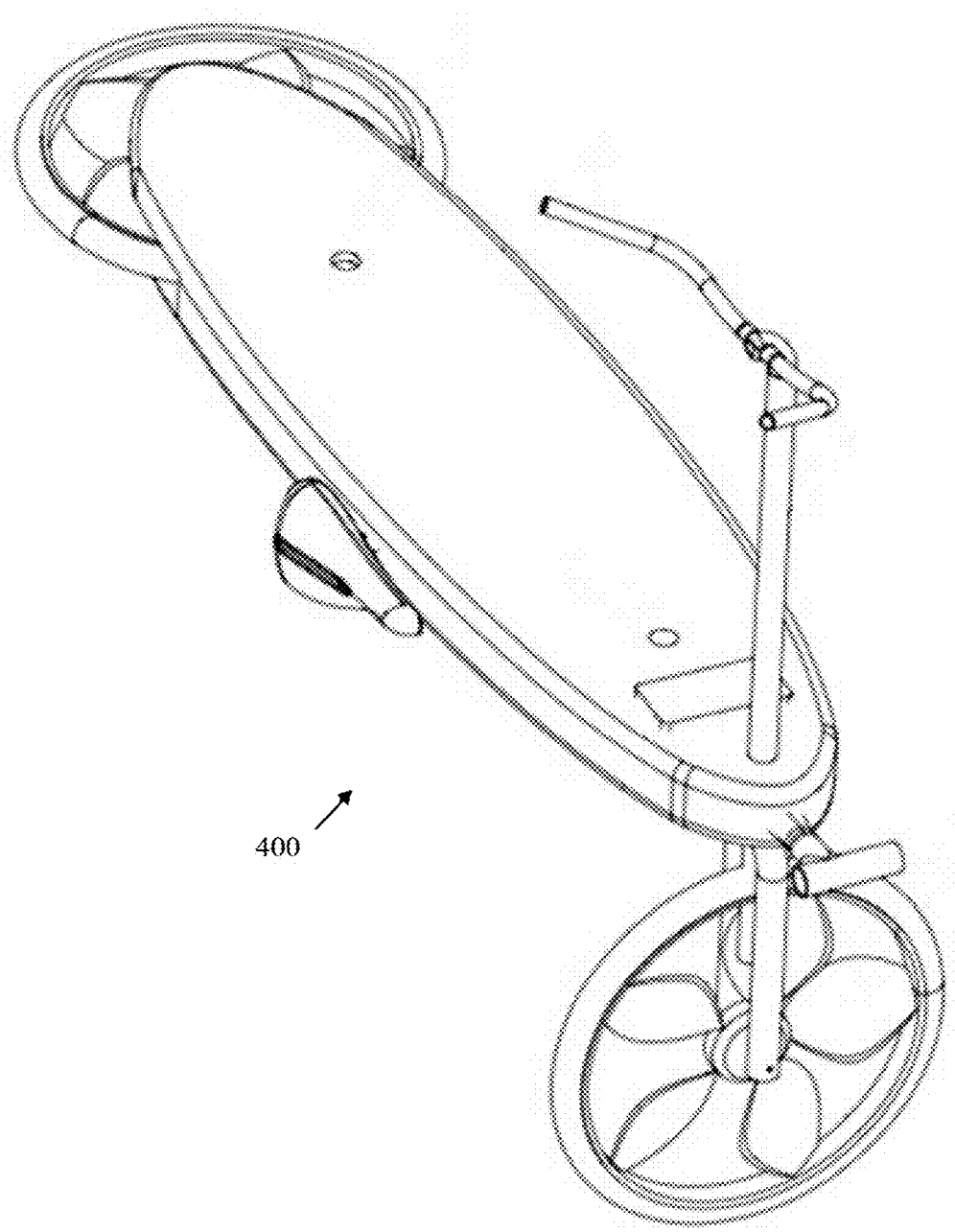
Figure 4C:
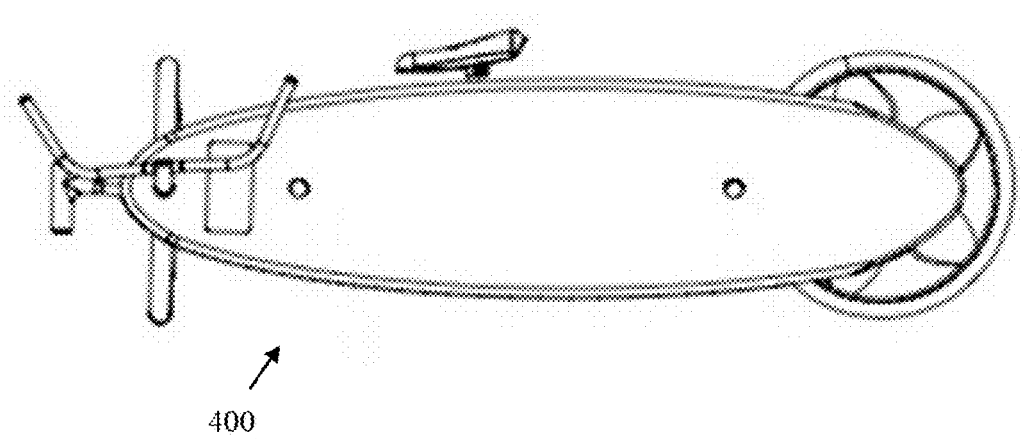
Figure 4D:
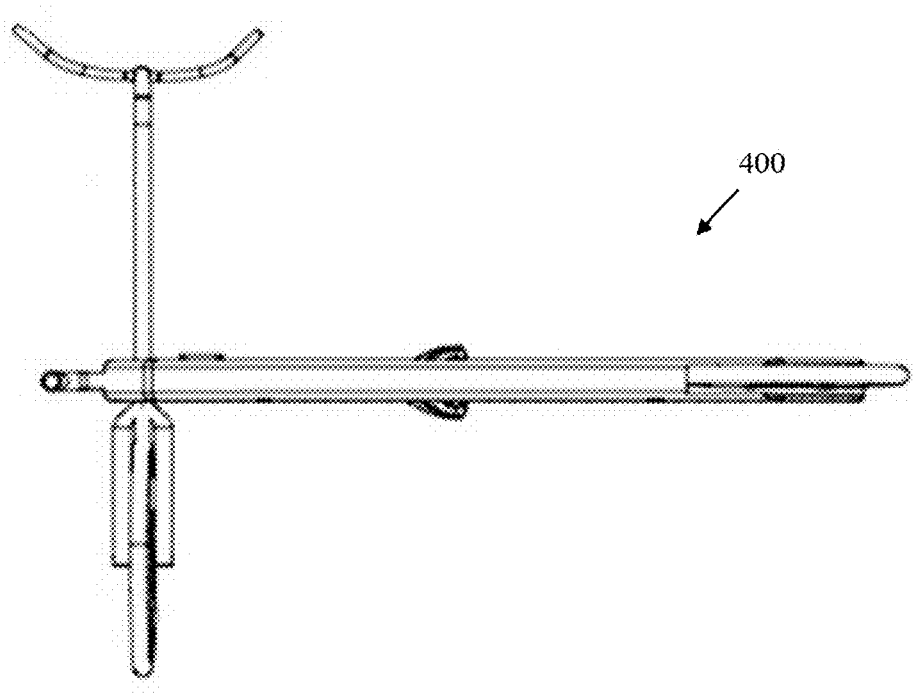

FIG. 4a illustrates a back perspective view of an electric bike board apparatus 400 in a fourth mode, Mode 4, a paddle board for use while standing, according to an embodiment. FIGS. 4b-d illustrate a front perspective, top, and side view, respectively, of the electric bike board apparatus 400 of FIG. 4a in Mode 4. To convert the bike board 400 to Mode 4, the handlebars 403 may be inserted into the slot 407-a on top side 401-a of the bike board 400 and the front wheel's rod (see 204aa in FIG. 2a), may be inserted into the slot 407-a on the bottom side (not shown) of the bike board 400. The handlebars 403 may be telescopic such that the height may be adjustable, and may be increased for use while standing on the bike board 400. An advantage is that the height may be adjustable for any user. Again, while the front bike wheel 404-a having a propeller 408 is spinning powered by motor 411-a, the bike board 400 is moving forward or backward, depending of course on the direction the front bike wheel and thus propeller are spinning. At the same time, the user may use the handlebars 403 to support him/herself and to steer the front wheel 404-a and thus the bike board 400 in order to travel in the desired direction while floating in the water.

Figure 5A:
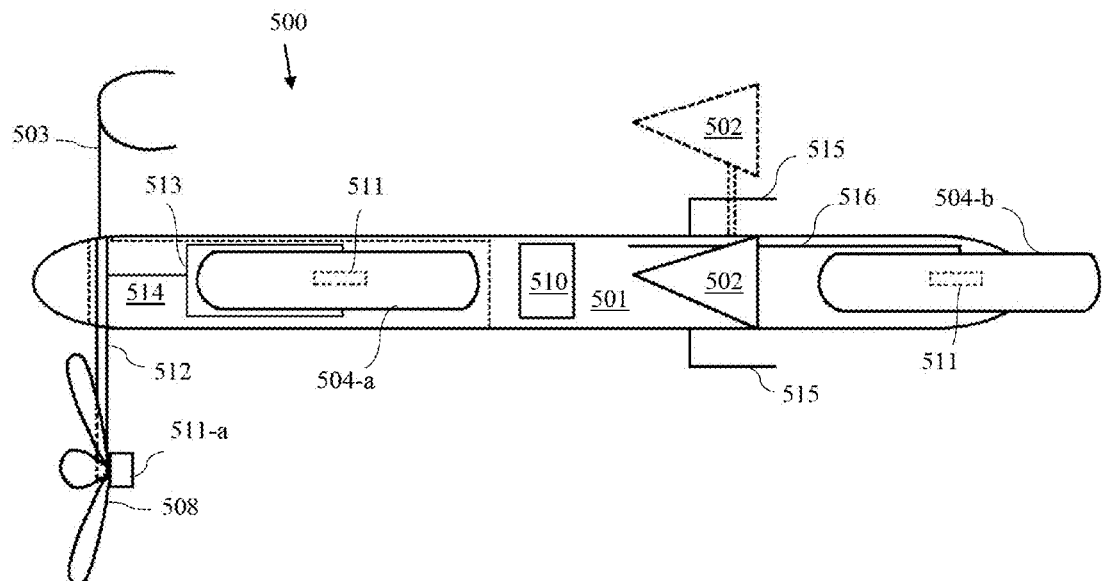
FIGS. 5a-b illustrate side views of a preferred embodiment of the electric bike board apparatus in a mode for use in water and a mode for use as a bicycle, respectively, wherein the front wheel and the propeller with a motor are separate.
Figure 5B:
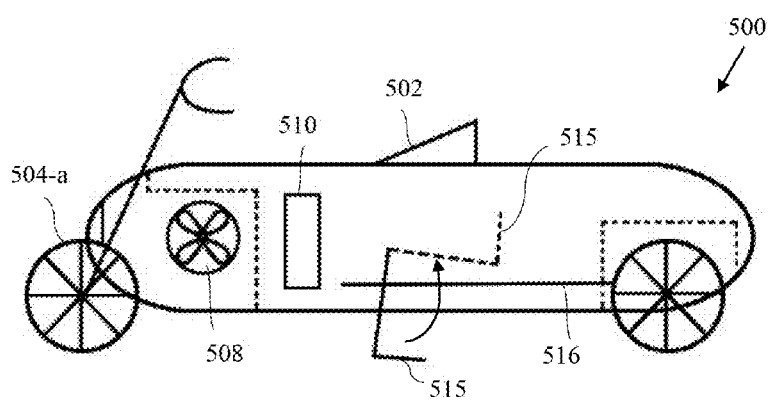

FIGS. 5a-b illustrate side views of a preferred embodiment of the electric bike board apparatus 500 in a mode for use in water and a mode for use as a bicycle, respectively, wherein the front wheel 504-a having a motor 511 and the propeller 508 having a motor 511-a are separate. The front wheel 504-a may be attached to a second fork 513, and the propeller 508 may be attached to a first fork 512. Each fork may independently fold out of the body 501 for use, as shown by the first fork 512, or fold into the body 501, as shown by the second fork 513, when not in use. The front wheel 504-*a* or propeller 508 may then be stored inside of a cavity 514 in the body 501. As shown in FIG. 5*a*, the bike board 500 would be used in the water, having the front wheel 504-*a* folded and stored into cavity 514 and propeller 508 down into the water. As described earlier, the handlebars 503 may be used to swivel the propeller 508 to steer the bike board 500. The seat 502 may also fold against or into the body 501. The handlebars 503 may be telescopic in order to fold down into or against the body 501.

The bike board 500 may include foot pegs 515, which may also be folded against or into the body 501, as shown in FIG. 5*b*. The foot pegs 515 may be connected to a wheel 504-*b* by a chain 516 and may be used to pedal the bike board 500 in a manual mode without electric power. Again, for use with electric power, the bike board 500 may include a motor 511, which may be associated with the front wheel 504-*a*. The rear wheel 504-*b* may also be associated with an additional or substitute motor 511. The propeller 508 may also have a drop-down motor 511-*a*. The motor or motors 511 may be powered by a battery 510. The drop-down motor 511-*a* may be wired to the battery 510 by any means known in the art, or a switch (not shown) may be included to send power to the drop-down motor 511-*a* or the front wheel 504-*a*. The wire (not shown) may be routed through the forks 512 and 513 to connect to the battery 510 and motor 511 or 511-*a*. Cables, belts, or any other transmission means for power may also be used. As shown in FIG. 5*b*, the bike board 500 would be used on land in bike mode, having the propeller 508 folded and stored into cavity 514 and front wheel 504-*a* down.

Figure 6:
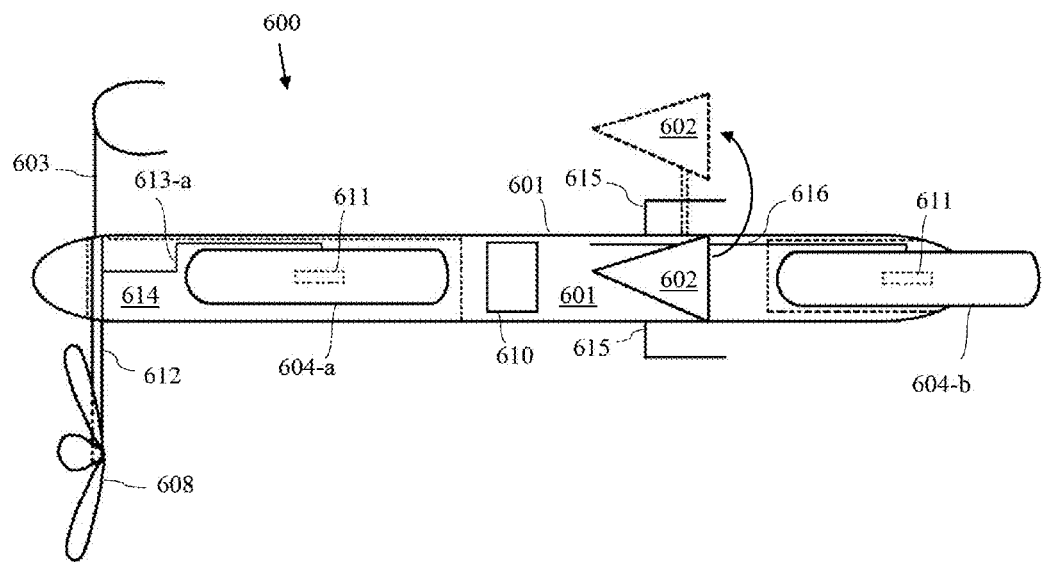
FIG. 6 illustrates a side view of an alternative embodiment of the bike board apparatus wherein the front wheel and the propeller without a motor are separate.

FIG. 6 illustrates a side view of an alternative embodiment of the bike board apparatus 600 wherein the front wheel 604-*a* having a motor 611 and the propeller 608 without a motor are separate. The propeller 608 may be associated with a first fork 612. Similarly as for the bike board from FIGS. 5*a-b*, when in the water, the front wheel 604-*a* may fold into a space 614 in the body 601 on a second fork 613-*a*. When on land, propeller 608 will replace the front wheel 604-*a* into space 614 and vice versa. The fork 613-*a* may be associated with the front wheel 604-*a* on only one side of the front wheel 604-*a*. Again, the seat 602 may fold against or into the body 601, and the foot pegs 615 may be connected to a wheel 604-*b* by a chain 616 and may be used to pedal the bike board 600 in a manual mode without electric power. Again, for use with electric power, the bike board 600 may include a motor 611, which may be associated with the front wheel 604-*a* as shown. A motor 611 may also be associated with the rear wheel 604-*b*. The propeller 608 without a motor may be powered by the motor 611 associated with the front wheel 604-*a*, and may be connected to it through a wire (not shown) or by any means known in the art. Again, cables, belts, or any other transmission means for power may also be used.

Figure 7:
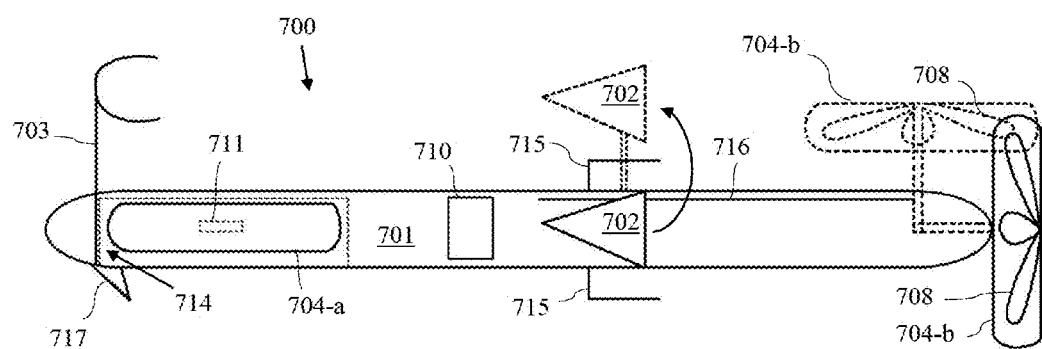
FIG. 7 illustrates a side view of an alternative embodiment of the electric bike board apparatus wherein a rudder may be provided.

FIG. 7 illustrates a side view of an alternative embodiment of the electric bike board apparatus 700 wherein a rudder 717 may be provided. The rudder 717 may be connected to the handlebars 703 for steering the bike board 700. The rudder 717 may fold into a space 714 in the body 701 when not in use, and may fold out when in use. The front wheel 704-*a* may fold into the space 714 when not in use, and my fold out when in use. The rear wheel 704-*b* may fold to lie against the body 701 as shown, or may fold into a space (not shown) in the body 701. The rear wheel 704-*b* may include a propeller 708 and may propel the bike board 700 when folded out as shown. In another alternative embodiment, the front wheel 704-*a* may fold against the body 701, or both wheels 704-*a* and 704-*b* may fold against the body 701. Again, the seat 702 may fold against the body 701, and the foot pegs 715 may be connected to a wheel 704-*b* by a chain 716 and may be used to pedal the bike board 700 in a manual mode without electric power. Again, for use with electric power, the bike board 700 may include a motor 711, which may be associated with the front wheel 704-*a* as shown. A motor 711 may also be associated with the rear wheel 704-*b*, and the propeller 708 may be powered by the motor 711. Again, cables, belts, or any other transmission means for power may also be used.

Figure 8A:
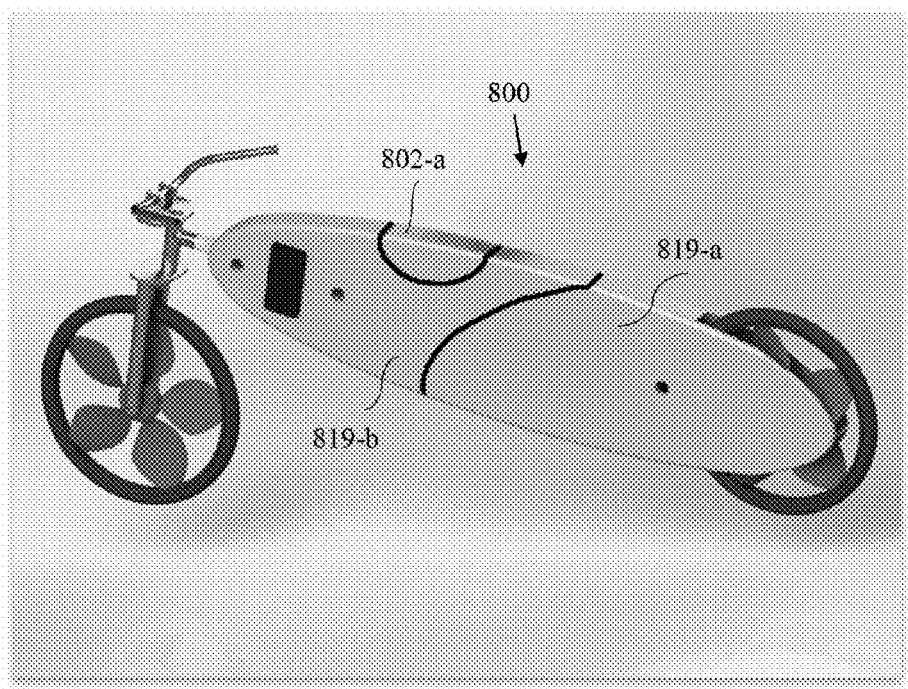
FIG. 8a illustrates a side perspective view of a convertible electric bike board apparatus in Mode 1, a bicycle, with a rear board portion inserted into a front board portion, and a seat provided in the side of the board, according to an embodiment.

FIG. 8*a* illustrates a side perspective view of a convertible electric bike board apparatus 800 in Mode 1, a bicycle, with a rear board portion 819-*a* inserted into a front board portion 819-*b*, and a seat 802-*a* provided in the side of the board 800, according to an embodiment. The board 800 may be converted from short to long, and vice versa, depending on the mode that is to be used. For example, shortening the board body 801 for use in Mode 1 may be achieved by inserting the rear board portion 819-*a* into the front board portion 819-*b*, and may allow for a smaller turning radius when using the bike board 800 as a bicycle. As another example, lengthening the board for use in Mode 2 may be achieved by pulling the front 819-*b* and rear 819-*a* board portions apart and may allow a user to rest their entire body on the bike board 800. The two board portions may be lockable at the desired length position using known means in the art such as by for example using a spring loaded snapping pin and corresponding holes, which a user can disengage to unlock.

Figure 8B:
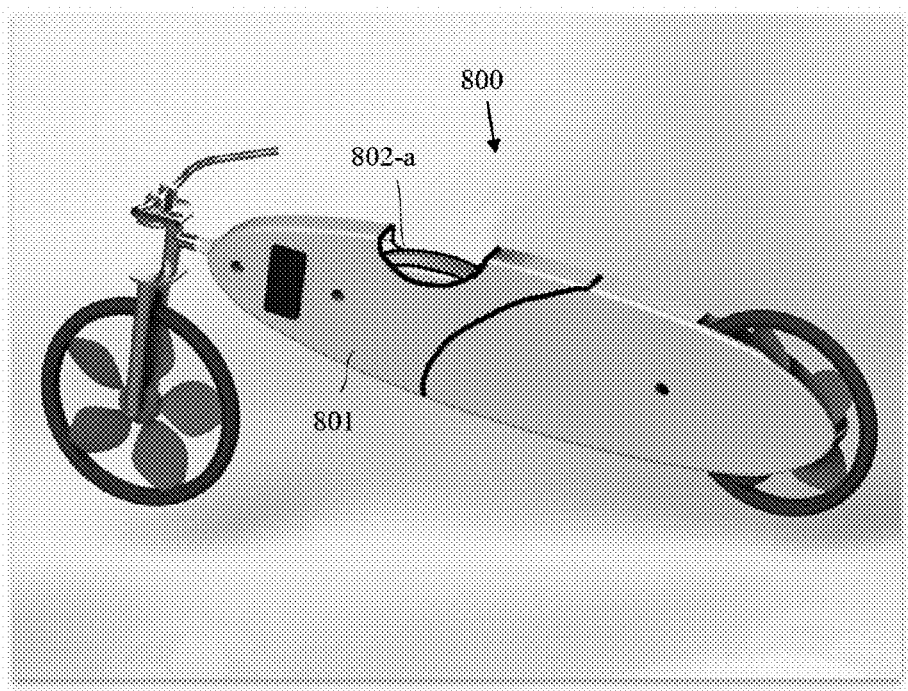
FIG. 8b illustrates a side perspective view of the convertible electric bike board apparatus of FIG. 8a, wherein a seat is provided by inserting a portion of the board down into a hollow cavity of the body of the board.

FIG. 8*b* illustrates a side perspective view of the convertible electric bike board apparatus 800 of FIG. 8*a*, wherein a seat 802-*a* is provided by inserting a portion of the board down into a hollow cavity of the body 801 of the board. The board body 801 may be partially hollow to accommodate the insertion of the seat 802-*a* into the board body 801. The seat 802-*a* may be configured to lock into either the up (as shown in FIG. 8*a*) or down (as shown in FIG. 8*b*) positions. The up position may be used in a board mode such as Mode 2, while the down position may be used in the bike mode, Mode 1.

Figure 8C:
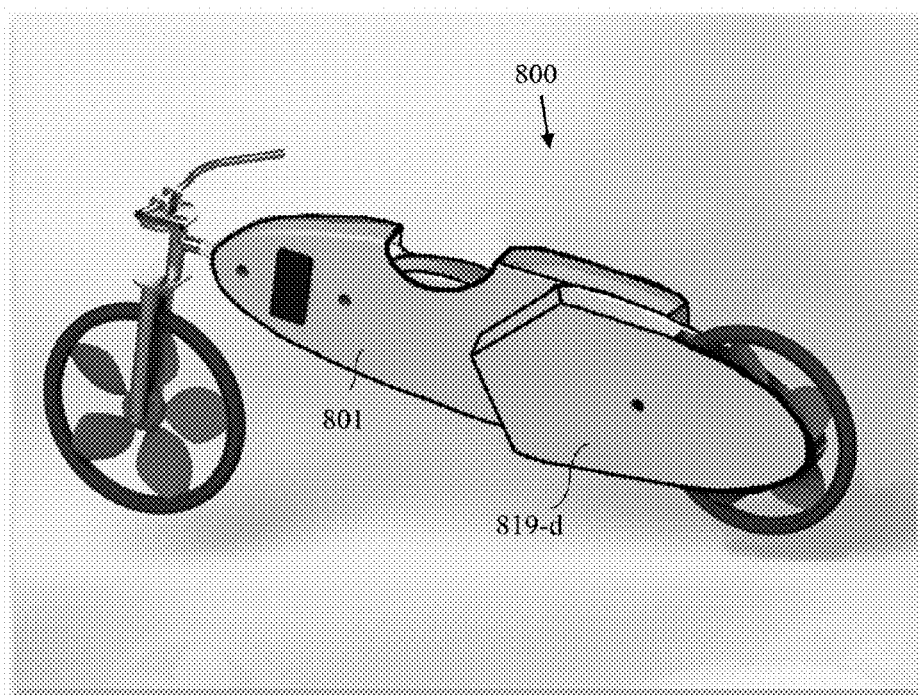
FIG. 8c illustrates a side perspective view of the convertible electric bike board apparatus in Mode 1, a bicycle, wherein the length of the board is shortened by moving a sliding end, according to an embodiment.

FIG. 8*c* illustrates a side perspective view of the convertible electric bike board apparatus 800 in Mode 1, a bicycle, wherein the length of the board 801 is shortened by moving a sliding end 819-*d*, according to an embodiment. Again, the board 800 may be converted from short to long, and vice versa, depending on the mode that is to be used. The sliding end 819-*d* may be positioned such that it is parallel to the rest of the body 801, creating a shorter bike board 800, as shown. The sliding end 819-*d* may also be moved to attach to the end of the body 801, creating a longer and flat bike board 800.

Figure 8D:
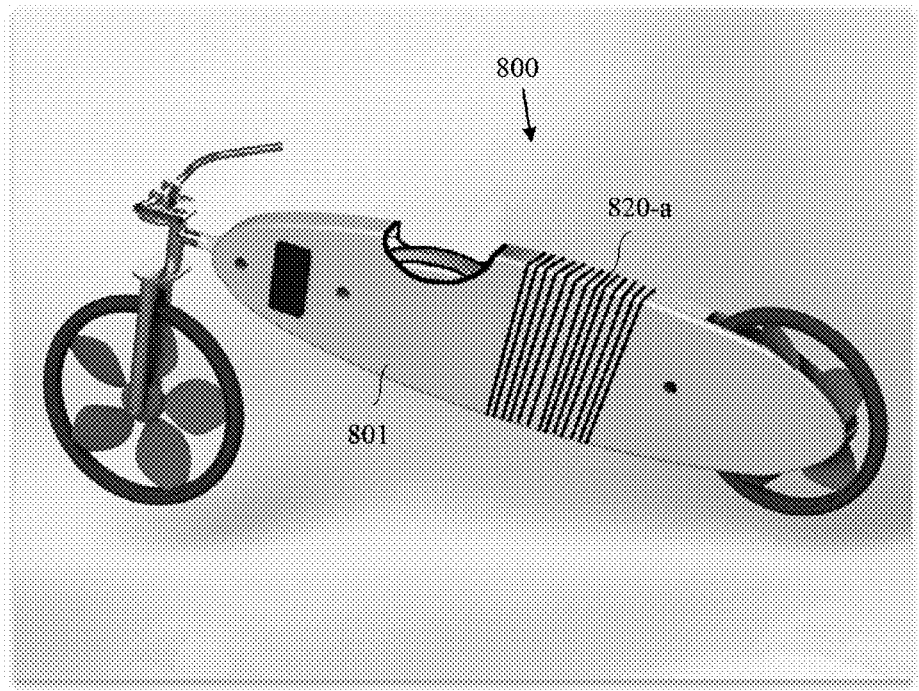
FIG. 8d illustrates a side perspective view of a convertible electric bike board apparatus in Mode 1, a bicycle, with a compressible middle portion, according to an embodiment.

FIG. 8*d* illustrates a side perspective view of a convertible electric bike board apparatus 800 in Mode 1, a bicycle, with a compressible middle portion 820-*a*, according to an embodiment. The compressible middle portion 820-*a* may be similar to an accordion, and may be stretched out for a longer body 801 or, as shown, may be compressed for a shorter body 801.

FIG. 9*a* illustrates a side view of a convertible electric bike board apparatus 900 in Mode 1, a bicycle, with a cutaway 924 showing that the bike board 900 has an inflatable middle portion 920-*b* not inflated and capped by two end caps 923-*a* and 923-*b*, according to an embodiment. The cutaway 924 also shows that the inside of the end caps 923-*a* and 923-*b* may hold a battery 910, a control box 925, and a propeller 908, which may come out of the end cap 923-*a* during a board mode.

The bike board 900 may be convertible between short and long modes by use of an inflatable middle portion 920-*b* with two end caps 923-*a* and 923-*b* on either end of the inflatable middle portion 920-*b*. An advantage, as discussed when referring to FIGS. 8*a-d*, may be that a shorter body while in bicycle mode would allow for a smaller turning radius, and a longer body while in a board mode would for example allow for the user to lay down on the board 900. The end caps 923-*a* and 923-*b* may be made of any suitable material that would provide sturdiness and buoyancy, such as, for instance, carbonite or styrofoam. The end caps 923-*a* and 923-*b* may lock together via a locking mechanism 921 between the two end caps 923-*a* and 923-*b* in a short mode, and the two end caps 923-*a* and 923-*b* may be unlocked and come apart allowing the board to expand in length while the middle portion 920-*b* is inflated, for a long mode. The locking mechanism 921 may be a lock, hook, clasp, or any other suitable method of locking the two end caps 923-*a* and 923-*b* together.

Solar panels 922 may be attached to one or both sides of the board 900 for charging the battery 910. A seat 902 may also be attached to one of the end caps 923-*a* and 923-*b*, such as, for instance, end cap 923-*a*, as shown. The rear end cap 923-*b* may also include a pocket 930 to hold a paddle 931 or any other accessory for use during recreation or other activity while using the bike board 900.

Figure 9B:
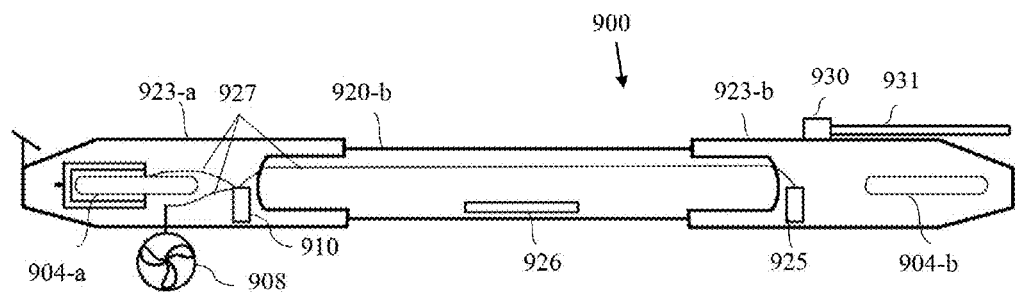
FIG. 9b illustrates a side view of the convertible electric bike board apparatus of FIG. 9a in a board mode, with an inflatable middle portion fully inflated, and the wheels tucked into the end caps.

FIG. 9*b* illustrates a side view of the convertible electric bike board apparatus 900 of FIG. 9*a* in a board mode, with an inflatable middle portion 920-*b* fully inflated, and the wheels 904-*a* and 904-*b* tucked into the end caps 923-*a* and 923-*b*. The inflatable middle portion 920-*b* may be automatically inflated by the an integrated pump powered by battery 910 of the bike board 900, and may increase the length of the entire bike board apparatus 900 when fully inflated. The inflatable middle portion 920-*b* may also be manually inflated by a user. When the inflatable middle portion 920-*b* is fully inflated, the bike board apparatus 900 may be locked into the long position. The inflatable middle portion 920-*b* may be constructed from any suitable material that may provide buoyancy and sturdiness to the bike board apparatus 900, and may have more than one layer of material (not shown). Cables 927 necessary for the function of the electric bike board 900 such as, for example, brake cables or cables connecting the battery 910 or control box 925 with the front wheel 904-*a* or propeller 908, may be tucked into the inflatable middle portion 920-*b* between layers of material or materials. The layers of the inflatable middle portion 920-*b* may, as an example, also hold a jet propulsion engine 926 for powering the bike board 900 while in a board mode.

Figure 9C:
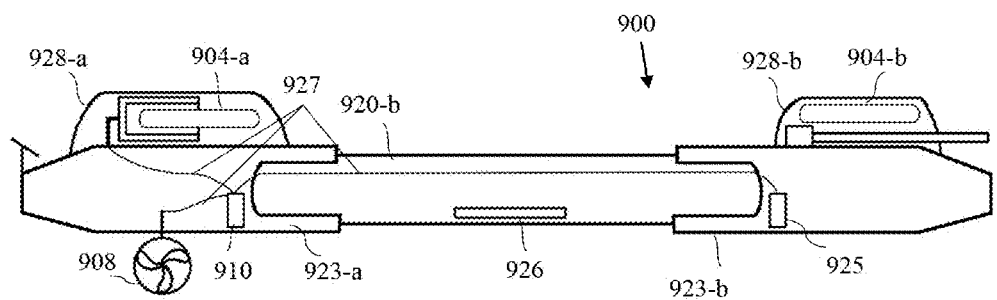
FIG. 9c illustrates a side view of the convertible electric bike board apparatus in a board mode, with an inflatable middle portion fully inflated, and the wheels encased on top of the end caps, according to an embodiment.

FIG. 9*c* illustrates a side view of the convertible electric bike board apparatus 900 in a board mode, with an inflatable middle portion 920-*b* fully inflated, and the wheels 904-*a* and 904-*b* encased in casings 928-*a* and 928-*b* on top of the end caps 923-*a* and 923-*b*, according to an embodiment. As shown, the wheels 904-*a* and 904-*b* may be stored on top of the board 900, or in any other suitable manner that would allow for buoyancy of the board 900. The casing 928-*a* and 928-*b* for the wheels 904-*a* and 904-*b* may be constructed from any suitable material, such as, for example, any material that the end caps 923-*a* and 923-*b* are constructed from.

As an example, each end cap 923-*a* or 923-*b* may be approximately 3 feet in length and 6 inches in height. With the inflatable middle portion 920-*b* fully inflated having a length of approximately 6 feet, altogether the entire bike board apparatus 900 may be approximately 12 feet long. In bike mode with the inflatable middle portion 920-*b* not fully inflated, the bike board apparatus 900 may be approximately 6 feet long.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A modular bicycle and board apparatus comprising a body, a front wheel and a rear wheel associated with the body, and handlebars associated with the body and the front wheel and configured to steer the front wheel, wherein the front wheel and the handlebars are removably associated with the body and with each other, wherein the body has a shape, a size, a strength and buoyancy characteristics of a board configured to support a user and prevent sinking when the user is positioned on top of the body while the modular bicycle and board apparatus is floating in water, in a surfboard mode, and also to function as a bicycle frame when the modular bicycle and board apparatus is used by the user in a bicycle mode, wherein the body has two opposite sides, a top side for receiving the user and a bottom side for contact with the water when the modular bicycle and board apparatus is in the surfboard mode, wherein the user can convert the modular bicycle and board apparatus from the bicycle mode to the surfboard mode by associating the front wheel and the handlebars with the body such that the front wheel extends from the bottom side into the water and the handlebars extend above the top side for use by the user to steer the modular bicycle and board apparatus in the water.

2. The modular bicycle and board apparatus of claim 1 further comprising a motor and a battery powering the motor, wherein the front wheel comprises a propeller, wherein the motor powers the front wheel and the propeller, thus allowing the modular bicycle and board apparatus to be used as an electric bicycle or as an electric surfboard in a laydown boogie board mode, a sitting boogie board mode or a stand-up board mode.

3. The modular bicycle and board apparatus of claim 1 wherein the propeller has fins which double as spokes of the front wheel.

4. The modular bicycle and board apparatus of claim 2 further having a first through slot, a second through slot, and a third through slot arranged lengthwise across the body, each being positioned for use as points of association of the handlebars and front wheel with the body for use of the modular bicycle and board apparatus in one of the laydown boogie board mode, sitting boogie board mode or stand-up board mode.

5. The modular bicycle and board apparatus of claim 1 wherein the rear wheel is substantially positioned and hidden in a recess of the body.

6. The modular bicycle and board apparatus of claim 1 wherein the front wheel or the rear wheel are associated with the body through forks and are folded into or against the body when not in use.

7. The modular bicycle and board apparatus of claim 1 further comprising a bicycle seat associated with the body.

8. The modular bicycle and board apparatus of claim 1, wherein no components are added to or removed from the modular bicycle and board apparatus when converting it from bicycle mode to surfboard mode and vice versa.

9. A modular bicycle and board apparatus comprising a buoyant board, a front wheel, a rear wheel and handlebars mountable and usable in a first configuration as a bicycle in which the buoyant board is the bicycle's frame and in a second configuration as a surfboard by changing the orientation of the front wheel and handlebars with 90 degrees with respect to the buoyant board, the surfboard being steerable from the handlebars through the front wheel.

10. The modular bicycle and board apparatus of claim 9 further comprising a motor and a battery powering the motor, wherein the front wheel comprises a propeller, wherein the motor can power the front wheel and the propeller, thus allowing the modular bicycle and board apparatus to be used as an electric bicycle or as an electric surfboard.

11. The modular bicycle and board apparatus of claim 10 wherein the propeller has fins which double as spokes of the front wheel.

12. The modular bicycle and board apparatus of claim 11 further having a first through slot, a second through slot, and a third through slot arranged lengthwise across the buoyant board, each being positioned for use as points of association of the handlebars and front wheel with the buoyant board for use of the modular bicycle and board apparatus in one of a laydown boogie board mode, sitting boogie board mode or stand-up board mode.

13. The modular bicycle and board apparatus of claim 10 wherein the rear wheel is substantially positioned and hidden in a recess of the buoyant board.

14. The modular bicycle and board apparatus of claim 10 wherein the front wheel or the rear wheel are associated with the buoyant board through forks and are foldable into or against the buoyant board when not in use.

15. The modular bicycle and board apparatus of claim 10 further comprising a bicycle seat associated with the buoyant board.

16. The modular bicycle and board apparatus of claim 10, wherein no components are added to or removed from the modular bicycle and board apparatus when converting it from bicycle configuration to surfboard configuration and vice versa.

17. The modular bicycle and board apparatus of claim 9, wherein the buoyant board has a rear board portion and a front board portion configured to be movable lengthwise away from the center of the buoyant board to increase the length of the buoyant board, and vice versa.

18. The modular bicycle and board apparatus of claim 17, wherein the rear board portion and the front board portion can slide lengthwise with respect to each other.

19. The modular bicycle and board apparatus of claim 17, further comprising an inflatable portion between the rear board portion and the front board portion, such that when the inflatable portion is inflated, the length of the buoyant board increases, and vice versa.

20. A modular bicycle and board apparatus comprising a buoyant board, a front wheel, a rear wheel, a propeller and handlebars mountable and usable in a first configuration as a bicycle in which the buoyant board is the bicycle's frame, and the propeller is folded into the buoyant board, and in a second configuration as a surfboard steerable from the handlebars through a rudder, by changing the orientation of the handlebars with 90 degrees with respect to the buoyant board, unfolding the propeller and folding in its place the front wheel, the modular bicycle and board apparatus further comprising a motor and a battery powering the motor, wherein the motor can power the front wheel and the propeller, thus allowing the modular bicycle and board apparatus to be used as an electric bicycle or as an electric surfboard.

\* \* \* \* \*